United States Patent
Herman et al.

(10) Patent No.: US 11,312,372 B2
(45) Date of Patent: Apr. 26, 2022

(54) VEHICLE PATH PREDICTION

(71) Applicant: Ford Global Technologies, LLC, Dearborn, MI (US)

(72) Inventors: David Michael Herman, Oak Park, MI (US); Ashwin Arunmozhi, Canton, MI (US); Venkatesh Krishnan, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 328 days.

(21) Appl. No.: 16/385,885

(22) Filed: Apr. 16, 2019

(65) Prior Publication Data

US 2020/0331465 A1 Oct. 22, 2020

(51) Int. Cl.
*B60W 30/09* (2012.01)
*B60W 30/095* (2012.01)
(Continued)

(52) U.S. Cl.
CPC ............ *B60W 30/09* (2013.01); *B60W 10/04* (2013.01); *B60W 10/18* (2013.01); *B60W 10/20* (2013.01); *B60W 30/0956* (2013.01); *B60W 50/0097* (2013.01); *G05D 1/0214* (2013.01); *G05D 1/0276* (2013.01); *G06N 3/08* (2013.01);
(Continued)

(58) Field of Classification Search
CPC ...... B60W 30/09; B60W 10/04; B60W 10/18; B60W 10/20; B60W 30/0956; B60W 50/0097; B60W 2556/65; B60W 2050/0077; B60W 2710/18; B60W 2710/20; G05D 1/0214; G05D 1/0276;
(Continued)

(56) References Cited

U.S. PATENT DOCUMENTS 8,315,756 B2 * 11/2012 Caveney ................ G08G 1/167
701/23
8,788,121 B2    7/2014 Klinger
(Continued)

OTHER PUBLICATIONS

Eslami, et. al., "Neural Scene Representation and Rendering", Research Article, Science 360, Jun. 15, 2018 (pp. 1204-1210), retrieved from the Internet: http://science.sciencemag.org/content/360/6394/1204 (8 pages).

(Continued)

*Primary Examiner* — Mahmoud S Ismail
*Assistant Examiner* — Gabriel Anfinrud
(74) *Attorney, Agent, or Firm* — Frank A. MacKenzie; Bejin Bieneman PLC

(57) ABSTRACT

A system, comprising a computer that includes a processor and a memory, the memory storing instructions executable by the processor to input second vehicle sensor data received via one or more of vehicle-to-vehicle (V-to-V) and vehicle-to-infrastructure (V-to-I) networking into a generative query neural network (GQN) trained to generate second vehicle viewpoint data and predict a path for a second vehicle based on the second vehicle viewpoint data with a reinforcement learning deep neural network (RLDNN). The computer can be further programmed to obtain a confidence for the predicted second vehicle path from a Bayesian framework applied to the RLDNN and determine a first vehicle path based on the predicted second vehicle path and the confidence.

20 Claims, 7 Drawing Sheets

(51) Int. Cl.
  *G08G 1/0968* (2006.01)
  *G08G 1/04* (2006.01)
  *B60W 10/04* (2006.01)
  *B60W 10/20* (2006.01)
  *B60W 10/18* (2012.01)
  *G05D 1/02* (2020.01)
  *G06N 3/08* (2006.01)
  *B60W 50/00* (2006.01)

(52) U.S. Cl.
  CPC ............. *G08G 1/04* (2013.01); *G08G 1/0968* (2013.01); *B60W 2050/0075* (2013.01); *B60W 2556/45* (2020.02); *B60W 2556/65* (2020.02); *B60W 2710/18* (2013.01); *B60W 2710/20* (2013.01); *G05D 2201/0213* (2013.01)

(58) Field of Classification Search
  CPC .... G05D 2201/0213; G06N 3/08; G08G 1/04; G08G 1/0968
  See application file for complete search history.

(56) References Cited

U.S. PATENT DOCUMENTS

| | | | |
|---|---|---|---|
| 9,784,592 | B2 | 10/2017 | Gupta et al. |
| 9,922,565 | B2 | 3/2018 | Thomas et al. |
| 2018/0086344 | A1 | 3/2018 | Zhu et al. |
| 2019/0228648 | A1* | 7/2019 | Moustafa ............. G08G 1/0116 |
| 2019/0236955 | A1* | 8/2019 | Hu ................... G08G 1/096844 |
| 2020/0192393 | A1* | 6/2020 | Aragon ............... B60W 50/085 |
| 2021/0001882 | A1* | 1/2021 | Mortazavi ............ G06K 9/6256 |

OTHER PUBLICATIONS

Geng, et. al., "A Scenario-Adaptive Driving Behavior Prediction Approach to Urban Autonomous Driving", MDPI Applied Sciences 2017, 7, 426 (21 pages).

Hoermann, et. al., "Dynamic Occupancy Grid Prediction for Urban Autonomous Driving: A Deep Learning Approach with Fully Automatic Labeling", 2018 IEEE International Conference on Robotics and Automation (ICRA), retrieved from Internet: https://ieeexplore.ieee.org/document/8460874 (1 page).

Kim, et. al., "Cooperative Perception for Autonomous Vehicle Control on the Road: Motivation and Experimental Results", 2013 IEEE/RSJ International Conference on Intelligent Robots and Systems (IROS), Nov. 3-7, 2013, Tokyo, Japan (pp. 5059-5066) (8 pages).

Macadam, "Understanding and Modeling the Human Driver", Vehicle System Dynamics 2003, vol. 40, Nos. 1-3 (pp. 101-134) (34 pages).

Sallab, et. al., "Deep Reinforcement Learning Framework for Autonomous Driving", ResearchGate Conference Paper, Dec. 2016, retrieved from the Internet: https://www.researchgate.net/publication/310409349 (7 pages).

* cited by examiner

VEHICLE PATH PREDICTION

BACKGROUND

Vehicles can be equipped to operate in both autonomous and occupant piloted mode. Vehicles can be equipped with computing devices, networks, sensors and controllers to acquire information regarding the vehicle's environment and to operate the vehicle based on the information. Safe and comfortable operation of the vehicle can depend upon acquiring accurate and timely information regarding the vehicle's environment. Vehicle sensors can provide data concerning routes to be traveled and objects to be avoided in the vehicle's environment. Safe and efficient operation of the vehicle can depend upon acquiring accurate and timely information regarding routes and objects in a vehicle's environment while the vehicle is being operated on a roadway.

DETAILED DESCRIPTION

Figure 1:
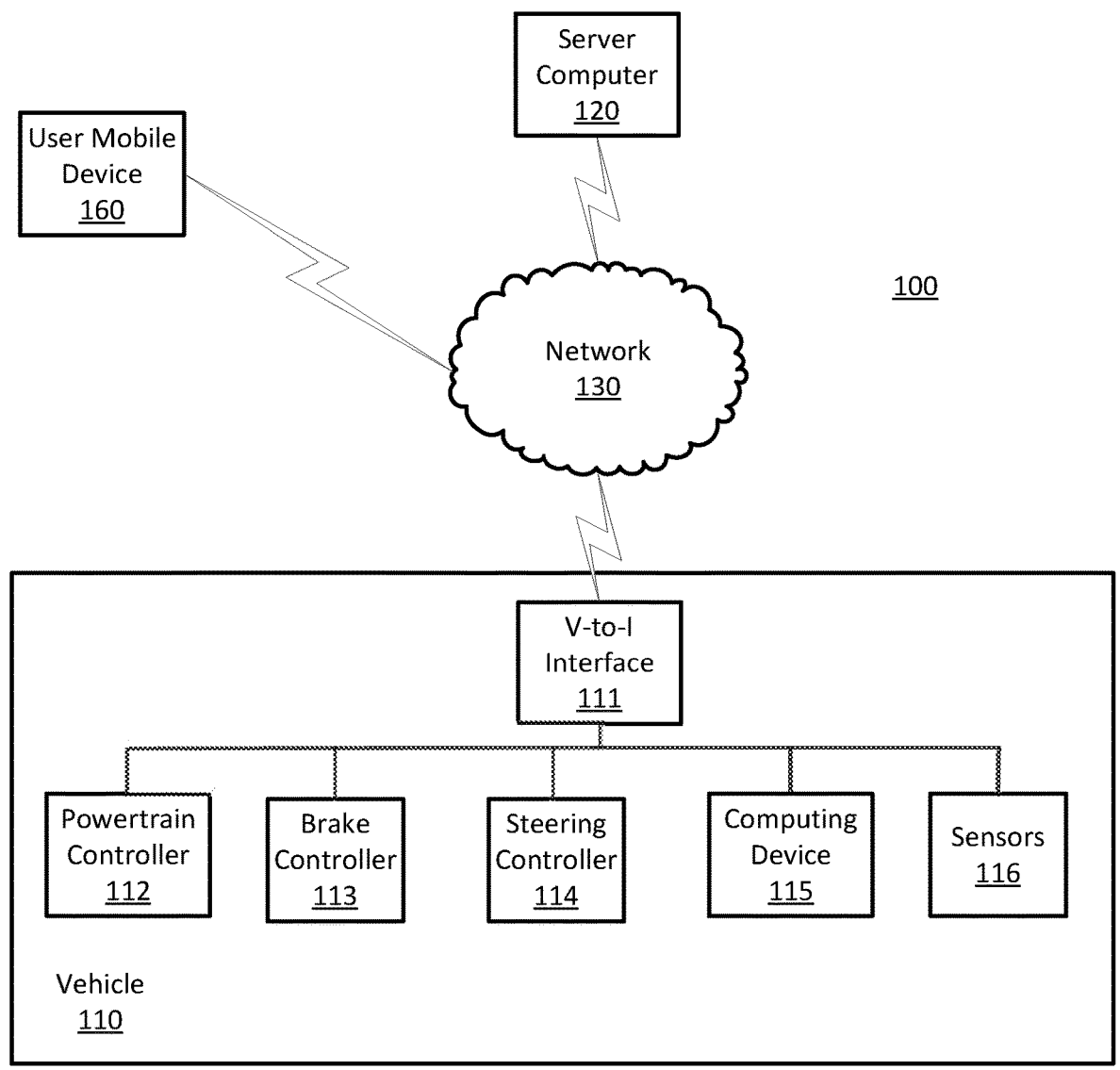
FIG. 1 is a block diagram of an example traffic infrastructure system.

Vehicles can be equipped to operate in both autonomous and occupant piloted mode. By a semi- or fully-autonomous mode, we mean a mode of operation wherein a vehicle can be piloted partly or entirely by a computing device as part of an information system having sensors and controllers. The vehicle can be occupied or unoccupied, but in either case the vehicle can be partly or completely piloted without assistance of an occupant. For purposes of this disclosure, an autonomous mode is defined as one in which each of vehicle propulsion (e.g., via a powertrain including an internal combustion engine and/or electric motor), braking, and steering are controlled by one or more vehicle computers; in a semi-autonomous mode the vehicle computer(s) control(s) one or two of vehicle propulsion, braking, and steering. In a non-autonomous vehicle, none of these are controlled by a computer.

A computing device in a vehicle can be programmed to acquire data regarding the external environment of a vehicle from vehicle sensors and use the data to determine a vehicle path upon which to operate a vehicle in autonomous or semi-autonomous mode. A vehicle can operate on a roadway based on a vehicle path by determining commands to direct the vehicle's powertrain, braking, and steering components to operate the vehicle so as to travel along the path. The data regarding the external environment can include the location of one or more moving objects such as vehicles and pedestrians, etc. in an environment around a vehicle and can be used by a computing device in the vehicle to operate the vehicle along with map data stored at memory included in the computing device or downloaded from a cloud-based server computer, for example.

Operating a vehicle based on static and moving object data can include determining a vehicle path that avoids collision or near-collision with static and moving objects. Static and moving objects are physical entities present in a vehicle's external environment with which the vehicle should avoid collision or near-collision. Static and moving objects can include vehicles, pedestrians, bicycles, etc. Predicting a path for moving objects that includes future locations for static and moving objects can permit a computing device to determine a vehicle path that avoids collisions or near-collisions with moving objects. Techniques discussed herein can improve vehicle operation by permitting a neural network included in the vehicle to predict a path for moving objects, including when objects to be avoided are not currently visible to a vehicle's sensors. For example, a pedestrian can be fully obscured or partially obscured from a vehicle's sensors. Other vehicles will avoid collision or near-collisions with the obscured or partially obscured object and can actively modify their motion plan. This can include a change to the steering angle, braking, or acceleration, for example. Path prediction for moving objects can be based on processing downloaded vehicle data with a generative query network (GQN) to produce image and other sensor data from points of view corresponding to other vehicles or sensors. A GQN is a deep neural network architecture that can be trained to output a predicted image and sensor data of a scene from a previously unseen point of view. This view may be based from the perspective of a pedestrian, a bicyclist, a vehicle, etc. The output predicted image and sensor data from a GQN can be processed to predict the motion plan of other moving objects (e.g. another car). A algorithm that can be used is a reinforcement learning deep neural network (RLDNN) to identify, classify, and locate moving objects. An RLNN can incorporate the field of view of the moving object, e.g. another vehicle. For example, another vehicle may have its own field of view obstructed such that a moving object is partially or fully occluded from its field of view. In such cases, the vehicle would choose a motion plan not incorporating such information.

Disclosed herein is method including inputting second vehicle sensor data received via one or more of vehicle-to-vehicle (V-to-V) and vehicle-to-infrastructure (V-to-I) networking into a generative query neural network (GQN) trained to generate second vehicle viewpoint data and predicting a path for a second vehicle based on the second vehicle viewpoint data with a reinforcement learning deep neural network (RLDNN). A confidence can be obtained for the predicted second vehicle path from a Bayesian framework applied to the RLDNN and a first vehicle path determined based on the predicted second vehicle path and the confidence. High definition (HD) map data can be downloaded from a cloud-based based traffic infrastructure system via V-to-I networking. The HD map data can be fused with the second vehicle viewpoint by projecting second vehicle viewpoint data onto the HD map data based on a location and a field of view of the second vehicle. Second vehicle sensor data can be processed with an RLDNN to detect moving objects in the second vehicle viewpoint data.

Sensor data acquired by traffic infrastructure video cameras can be included in second vehicle viewpoint data. The path for the second vehicle can be predicted based on one or more of receiving vehicle sensor data from the second vehicle and determining path data based on processing observations of the second vehicle with a second RLDNN.

The Bayesian framework can determine the confidence based on a prediction accuracy determined based on observations of previous output prediction accuracies. The second vehicle viewpoint data can be compared to the second vehicle sensor data to determine second vehicle sensor data accuracy. A first vehicle path determined based on the predicted second vehicle path the confidence can include avoiding collisions and near-collisions. A first vehicle can be operated based on the first vehicle path by controlling vehicle powertrain, steering and braking. Global coordinates can be determined based on a location and a field of view of a video camera. The predicted vehicle path can be determined at a server computer included in a traffic information system. The predicted vehicle path can be downloaded to the vehicle from a server computer.

Further disclosed is a computer readable medium, storing program instructions for executing some or all of the above method steps. Further disclosed is a computer programmed for executing some or all of the above method steps, including a computer apparatus, programmed to input second vehicle sensor data received via one or more of vehicle-to-vehicle (V-to-V) and vehicle-to-infrastructure (V-to-I) networking into a generative query neural network (GQN) trained to generate second vehicle viewpoint data and predict a path for a second vehicle based on the second vehicle viewpoint data with a reinforcement learning deep neural network (RLDNN). A confidence can be obtained for the predicted second vehicle path from a Bayesian framework applied to the RLDNN and a first vehicle path determined based on the predicted second vehicle path and the confidence. High definition (HD) map data can be downloaded from a cloud-based based traffic infrastructure system via V-to-I networking. The HD map data can be fused with the second vehicle viewpoint by projecting second vehicle viewpoint data onto the HD map data based on a location and a field of view of the second vehicle. Second vehicle sensor data can be processed with a RLDNN to detect moving objects in the second vehicle viewpoint data.

The computer apparatus can be further programmed to include sensor data acquired by traffic infrastructure video cameras in second vehicle viewpoint data. The path for the second vehicle can be predicted based on one or more of receiving vehicle sensor data from the second vehicle and determining path data based on processing observations of the second vehicle with a second RLDNN. The Bayesian framework can determine the confidence based on a prediction accuracy determined based on observations of previous output prediction accuracies. The second vehicle viewpoint data can be compared to the second vehicle sensor data to determine second vehicle sensor data accuracy. A first vehicle path determined based on the predicted second vehicle path and the confidence can include avoiding collisions and near-collisions. A first vehicle can be operated based on the first vehicle path by controlling vehicle powertrain, steering and braking. Global coordinates can be determined based on a location and a field of view of a video camera. The predicted vehicle path can be determined at a server computer included in a traffic information system. The predicted vehicle path can be downloaded to the vehicle from a server computer.

FIG. 1 is a diagram of a traffic infrastructure system 100 that includes a vehicle 110 operable in autonomous ("autonomous" by itself in this disclosure means "fully autonomous"), semi-autonomous, and occupant piloted (also referred to as non-autonomous) mode. One or more vehicle 110 computing devices 115 can receive information regarding the operation of the vehicle 110 from sensors 116. The computing device 115 may operate the vehicle 110 in an autonomous mode, a semi-autonomous mode, or a non-autonomous mode.

The computing device 115 includes a processor and a memory such as are known. Further, the memory includes one or more forms of computer-readable media, and stores instructions executable by the processor for performing various operations, including as disclosed herein. For example, the computing device 115 may include programming to operate one or more of vehicle brakes, propulsion (e.g., control of acceleration in the vehicle 110 by controlling one or more of an internal combustion engine, electric motor, hybrid engine, etc.), steering, climate control, doors, splitter, diffuser, spoiler, interior and/or exterior lights, etc., as well as to determine whether and when the computing device 115, as opposed to a human operator, is to control such operations.

The computing device 115 may include or be communicatively coupled to, e.g., via a vehicle communications bus as described further below, more than one computing devices, e.g., controllers or the like included in the vehicle 110 for monitoring and/or controlling various vehicle components, e.g., a powertrain controller 112, a brake controller 113, a steering controller 114, etc. The computing device 115 is generally arranged for communications on a vehicle communication network, e.g., including a bus in the vehicle 110 such as a controller area network (CAN) or the like; the vehicle 110 network can additionally or alternatively include wired or wireless communication mechanisms such as are known, e.g., Ethernet or other communication protocols.

Via the vehicle network, the computing device 115 may transmit messages to various devices in the vehicle and/or receive messages from the various devices, e.g., controllers, actuators, sensors, etc., including sensors 116. Alternatively, or additionally, in cases where the computing device 115 actually comprises multiple devices, the vehicle communication network may be used for communications between devices represented as the computing device 115 in this disclosure. Further, as mentioned below, various controllers or sensing elements such as sensors 116 may provide data to the computing device 115 via the vehicle communication network.

In addition, the computing device 115 may be configured for communicating through a vehicle-to-infrastructure (V-to-I) interface 111 with a server computer 120, e.g., a cloud server, via a network 130, which, as described below, includes hardware, firmware, and software that permits computing device 115 to communicate with a server computer 120 via a network 130 such as wireless Internet (Wi-Fi) or cellular networks. V-to-I interface 111 may accordingly include processors, memory, transceivers, etc., configured to utilize various wired and/or wireless networking technologies, e.g., cellular, BLUETOOTH® and wired and/or wireless packet networks. Computing device 115 may be configured for communicating with other vehicles 110 through V-to-I interface 111 using vehicle-to-vehicle (V-to-V) networks, e.g., according to Dedicated Short Range Communications (DSRC) and/or the like, e.g., formed on an ad hoc basis among nearby vehicles 110 or formed through infrastructure-based networks. The computing device 115 also includes nonvolatile memory such as is known. Computing device 115 can log information by storing the information in nonvolatile memory for later retrieval and transmittal via the vehicle communication network and a vehicle to infrastructure (V-to-I) interface 111 to a server computer 120 or user mobile device 160.

As already mentioned, generally included in instructions stored in the memory and executable by the processor of the computing device 115 is programming for operating one or more vehicle 110 components, e.g., braking, steering, propulsion, etc., without intervention of a human operator. Using data received in the computing device 115, e.g., the sensor data from the sensors 116, the server computer 120, etc., the computing device 115 may make various determinations and/or control various vehicle 110 components and/or operations without a driver to operate the vehicle 110. For example, the computing device 115 may include programming to regulate vehicle 110 operational behaviors (i.e., physical manifestations of vehicle 110 operation) such as speed, acceleration, deceleration, steering, etc., as well as tactical behaviors (i.e., control of operational behaviors typically in a manner intended to achieve safe and efficient traversal of a route) such as a distance between vehicles and/or amount of time between vehicles, lane-change, minimum gap between vehicles, left-turn-across-path minimum, path planning, time-to-arrival at a particular location and intersection (without signal) minimum time-to-arrival to cross the intersection.

Controllers, as that term is used herein, include computing devices that typically are programmed to control a specific vehicle subsystem. Examples include a powertrain controller 112, a brake controller 113, and a steering controller 114. A controller may be an electronic control unit (ECU) such as is known, possibly including additional programming as described herein. The controllers may communicatively be connected to and receive instructions from the computing device 115 to actuate the subsystem according to the instructions. For example, the brake controller 113 may receive instructions from the computing device 115 to operate the brakes of the vehicle 110.

The one or more controllers 112, 113, 114 for the vehicle 110 may include known electronic control units (ECUs) or the like including, as non-limiting examples, one or more powertrain controllers 112, one or more brake controllers 113, and one or more steering controllers 114. Each of the controllers 112, 113, 114 may include respective processors and memories and one or more actuators. The controllers 112, 113, 114 may be programmed and connected to a vehicle 110 communications bus, such as a controller area network (CAN) bus or local interconnect network (LIN) bus, to receive instructions from the computer 115 and control actuators based on the instructions.

Sensors 116 may include a variety of devices known to provide data via the vehicle communications bus. For example, a radar fixed to a front bumper (not shown) of the vehicle 110 may provide a distance from the vehicle 110 to a next vehicle in front of the vehicle 110, or a global positioning system (GPS) sensor disposed in the vehicle 110 may provide geographical coordinates of the vehicle 110. The distance(s) provided by the radar and/or other sensors 116 and/or the geographical coordinates provided by the GPS sensor may be used by the computing device 115 to operate the vehicle 110 autonomously or semi-autonomously, for example.

The vehicle 110 is generally a land-based vehicle 110 capable of autonomous and/or semi-autonomous operation and having three or more wheels, e.g., a passenger car, light truck, etc. The vehicle 110 includes one or more sensors 116, the V-to-I interface 111, the computing device 115 and one or more controllers 112, 113, 114. The sensors 116 may collect data related to the vehicle 110 and the environment in which the vehicle 110 is operating. By way of example, and not limitation, sensors 116 may include, e.g., altimeters, cameras, LIDAR, radar, ultrasonic sensors, infrared sensors, pressure sensors, microphones, accelerometers, gyroscopes, temperature sensors, pressure sensors, hall sensors, optical sensors, voltage sensors, current sensors, mechanical sensors such as switches, etc. The sensors 116 may be used to sense the environment in which the vehicle 110 is operating, e.g., sensors 116 can detect phenomena such as weather conditions (precipitation, external ambient temperature, etc.), the grade of a road, the location of a road (e.g., using road edges, lane markings, etc.), or locations of target objects such as neighboring vehicles 110. The sensors 116 may further be used to collect data including dynamic vehicle 110 data related to operations of the vehicle 110 such as velocity, yaw rate, steering angle, engine speed, brake pressure, oil pressure, the power level applied to controllers 112, 113, 114 in the vehicle 110, connectivity between components, and accurate and timely performance of components of the vehicle 110.

Figure 2:
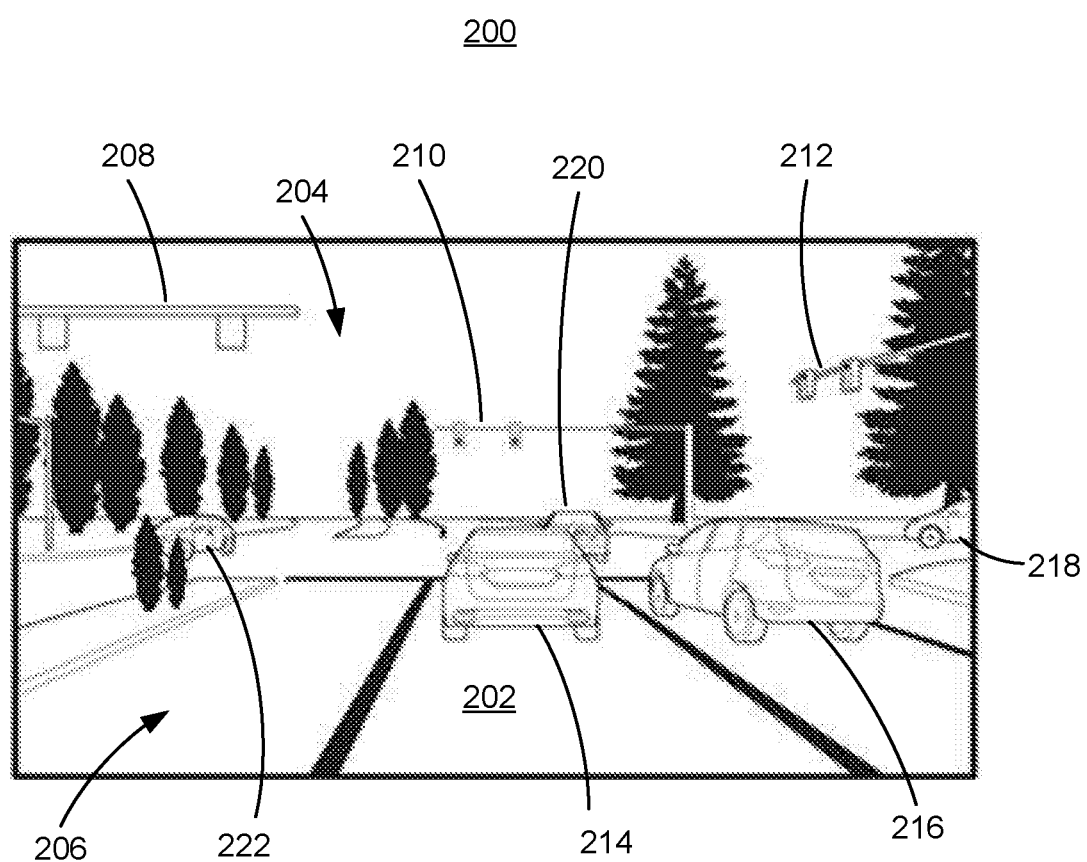
FIG. 2 is a diagram of an example image of a traffic scene.

FIG. 2 is a diagram of an example image 200 of a traffic scene. The image 200 is a red-green-blue (RGB) color video image rendered in black and white to comply with Patent Office regulations. The image 200 can be acquired by a video sensor 116 included in a vehicle 110, for example. The image 200 includes a roadway 202 including an intersection 204, traffic markings 206 including lane markers and curbs, etc., traffic signals 208, 210, 212, and other vehicles 214, 216, 218, 220. A computing device 115 in vehicle 110 can process image 200 to try to determine future likely paths for other vehicles 214, 216, 218, 220. Computing device 115 can use determined future likely paths for other vehicles 214, 216, 218, 220 to determine a vehicle path for vehicle 110 to travel that safely avoids collisions or near collisions with other vehicles 214, 216, 218, 220. Safely avoiding collisions or near-collisions is defined as avoiding user defined limits on lateral and longitudinal accelerations while avoiding user defined limits on distance between vehicles.

Computing device 115 can process image 200 with a convolutional neural network (CNN), for example, to determine output data that identifies, classifies and locates traffic markings 206, traffic signals 208, 210, 212, and other vehicles 214, 216, 218, 220. Identification of a vehicle includes determining a connected region of pixels in an image 200 and labeling the region of pixels as a vehicle. Classification of a vehicle includes determining which class out of a limited number of classes an identified object belongs to. In addition, a confidence that the classification is correct can be determined based on Bayesian framework applied to the CNN. Location of a vehicle includes determining a minimally enclosing rectangle for the connected region of pixels corresponding to a vehicle. Location in pixel coordinates can be converted to global coordinates based on a location and direction and magnification of a field of view for the video sensor that acquired image 200, along with data regarding location of a two-dimensional (2D) plane parallel to and coincident with roadway 202. This roadway 202 location data can be determined based on sensor 116 data including GPS and inertial measurement units (IMUs), for example.

A CNN that processes an image 200 to produce object data includes a plurality of convolutional layers and a plurality of fully connected layers that process an image 200 to output object data including object identity, class and location. Object identity is determining that a connected region of pixels in an image corresponds to a moving object. Object class is determining which label, of a limited number of class labels, can be applied to an identified object, where class labels include vehicle, pedestrian, bicycle, etc. Object location is a location and size of a minimally enclosing rectangle for the connected region of pixels corresponding to a moving object, expressed in pixel coordinates. The deep neural network can be trained based on ground truth data, where backpropagated object data is compared to object data obtained independently from the CNN. For example, identity and location data for an object in image 200 data can be determined by user input based on measurements applied to pixels of image 200 data. At training time output object data can be backpropagated to be compared to ground truth object data to determine rewards based on a reward function that can be input to the DNN along with the image 200 to train the CNN to identify, classify, and locate objects.

The CNN can be enclosed in a Bayesian framework that determines a probability corresponding to the predictive accuracy of the output object data based on previously observed predictive accuracy of output object data. A Bayesian framework records output object data and determines a probability that the CNN will accurately predict object data by tracking previously observed object data. Bayesian inference calculates probabilities, i.e the confidence of the network's prediction, based on conditional probabilities, i.e. the probability of an event where the probability of the event is determined assuming that another, independent event has occurred, for example. A Bayesian framework can determine prediction accuracy for a CNN conditioned on observations of previous prediction accuracies. Application of Bayesian inference to CNN processing improves CNN processing by determining a predictive accuracy corresponding to the output of the CNN based on historical object data output. The predictive accuracy can be used by a computing device 115 to determine a confidence value to apply to the output of the CNN to predict future locations of one or more of vehicles 214, 216, 218, 220, 222, for example. A confidence value can be determined by thresholding predictive accuracy values based on user determined values. For example, predictive accuracy values greater than 0.7 can be categorized as "high" confidence, while predictive accuracy values less than 0.5 can be categorized as "low" confidence.

Predictions of future locations of vehicles 214, 216 visible in image 200 as objects with complete, uninterrupted outlines can be determined by a CNN in a Bayesian framework. Predictions of future locations of vehicles 218, 220, 222 visible as only partial outlines generally cannot be determined by a neural network in a Bayesian framework processing an image 200 acquired from a video sensor included in a vehicle 110. To permit a computing device 115 to predict future locations of partially visible vehicles 218, 220, 222, computing device 115 can acquire data regarding vehicles 218, 220, 222 from other sensors included in other vehicles 214, 216, 218, 220, 222 or stationary cameras included in a traffic infrastructure system 100, for example. The data can include front-view, side-view or back-view video sensor data, and other sensor types and locations, for example front or rear lidar or radar, and GPS and inertial measurement unit (IMU) data corresponding to location, direction and motion. sensor data from other vehicles (V-to-V) and traffic infrastructure systems 100 (V-to-I) (together V-to-X) can be fused with object data obtained from sensors 116 to provide a more complete view of traffic scene 200. Sensor fusion can be illustrated in a high definition (HD) map, which combines data from vehicle 110 sensors, and V-to-X data, which can include HD map data from a traffic infrastructure system 100, or sensor data from other vehicles.

Figure 3:
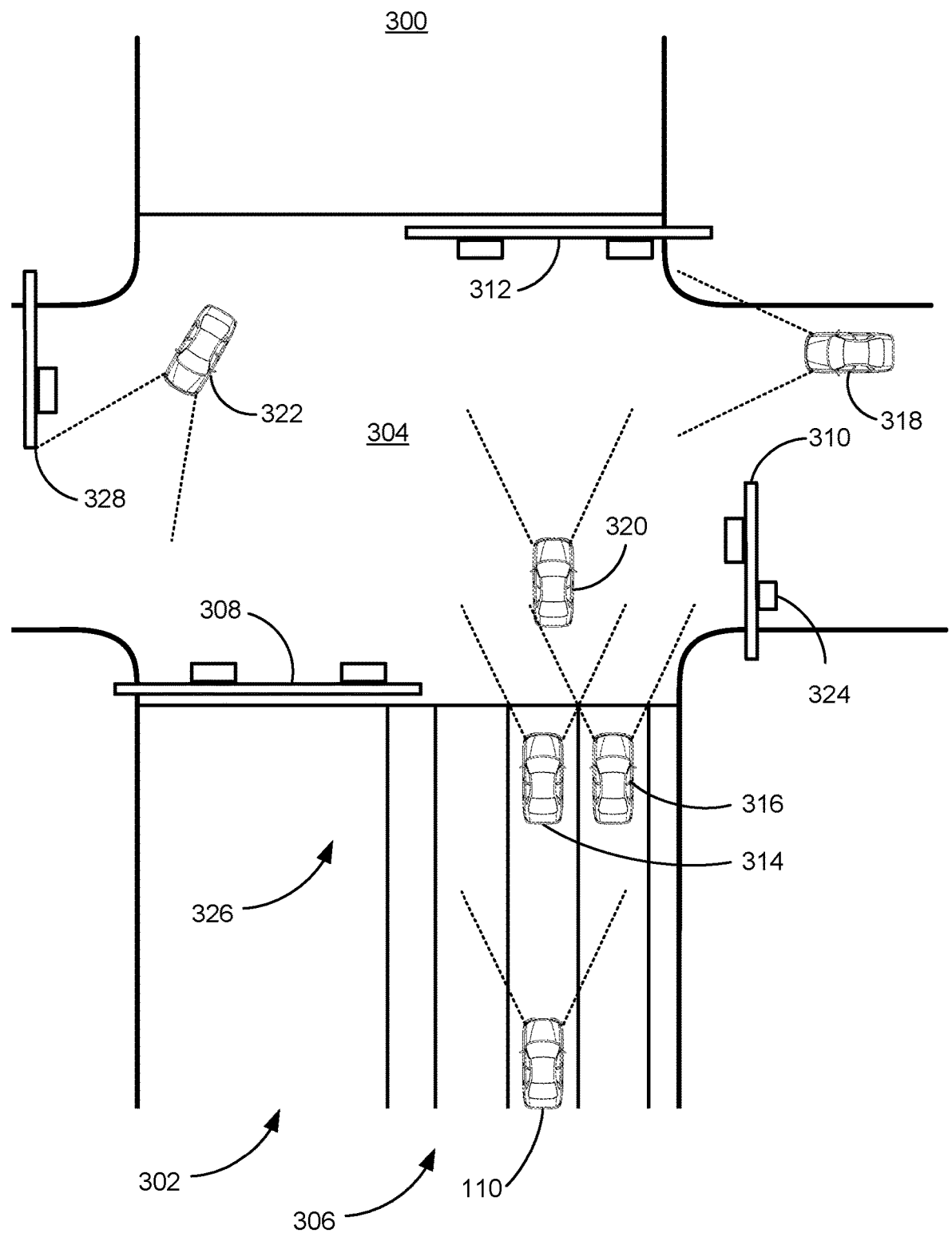
FIG. 3 is a diagram of an example high definition (HD) traffic map.

FIG. 3 is a diagram of a high definition (HD) map 300. An HD map 300 is a map of a geographic area similar to GOOGLE™ maps. HD maps can be downloaded from cloud-based traffic infrastructure systems 100, for example from a server computer 120 via V-to-I networking. HD maps 300 can differ from maps provided for viewing by human users such as GOOGLE maps in that HD maps can include resolution of less than 10 centimeters (cm) in x and y directions. Resolution in the single-digit cm range can be required to operate a vehicle 110 on a roadway 202. Single-digit cm resolution can be required to locate a vehicle accurately enough to permit operation on a roadway. For example, lane markers can be less than 10 cm wide. A map with resolution of less than 10 cm could completely miss a lane marker. An HD map 300 can be used by computing device 115 to fuse V-to-X data with data from processing image 200 data. HD map 300 includes a roadway 302 including an intersection 304 and traffic boundaries 306 including curbs and lane markers, vehicle 110, vehicles 314, 316, 318, 320, 322 (collectively vehicles 326) corresponding to vehicles 214, 216, 218, 220, 222 from image 200, and traffic signals 308, 310, 312 corresponding to traffic signals 208, 210, 212 from image 200. HD map 300 also includes a traffic signal 328 not visible in image 200 that was supplied by a traffic infrastructure system 100 or another vehicle sensor data. Pairs of dotted lines attached to each vehicle 326 show the outlines of forward-looking fields of view of sensors included in each vehicle 326. HD map 300 also includes a stationary video camera 324 that can be in communication with a traffic infrastructure system 100 to acquire video data of a traffic scene for further processing by the traffic infrastructure system 100 using techniques described herein to detect moving objects.

HD maps 300 can include data regarding stationary or fixed objects such as buildings, traffic signals, and traffic signs acquired by vehicle 110 while operating on a roadway 202. As routes are repeated, a vehicle 110 can acquire information regarding objects along the way. Other vehicles can also acquire data regarding objects along a roadway 202 and upload the data to a traffic infrastructure system 100 server computer 120. A vehicle 110 can download HD map 300 data from a server computer 120 based on an intended route, for example, or the HD map 300 data can be preloaded and stored at nonvolatile memory included in computing device 115. Fusing data from multiple sources in an HD map 300 can verify the accuracy of data by providing data redundancy. Multiple measures of an object's location can be processed by traffic infrastructure system 100 server computer 120 to assure that the multiple measures agree as a redundancy check.

Mobile objects in the environment exhibiting dynamic behavior can be identified in the HD map 300, which helps to identify the potential hazards around a vehicle 110. For example, a cyclist travelling alongside the vehicle, other vehicles in front of the host vehicle, pedestrians crossing a roadway and pedestrians walking on a sidewalk are all potential risk points whose future path should be predicted to safely avoid collisions or near-collisions. Safely avoiding collisions is defined as avoiding contact by a user-defined limit while avoiding user defined limits on lateral and longitudinal accelerations. Traffic infrastructure systems can include stationary cameras continuously recording roadways 202. Host vehicle could potentially include V-to-X data exchange with static objects like buildings that broadcast or transmit a location or locations, via a network such as the "Internet of things," for example, to help populate HD maps 300.

The addition of static and dynamic objects to an HD map 300 can be performed based on machine vision techniques to detect objects on roadways and tracking algorithms to determine change in position and distance in consecutive image frames as are known. For example, CNNs in a Bayesian framework can detect and locate objects such as vehicle, pedestrian, bicycle, etc. in a field of view as discussed above with respect to FIG. 2 and can use the object data to predict future locations of moving objects. Techniques described herein can use a GQN system to project sensor data sensed and received by a vehicle 110 to generate a scene representation or image. From this scene representation the GQN can project the sensor data onto a perspective of a mobile actor, such as a bicyclist, pedestrian, another vehicle (including those without the ability to share image data over V2V communication), and other mobile actors.

Figure 4:
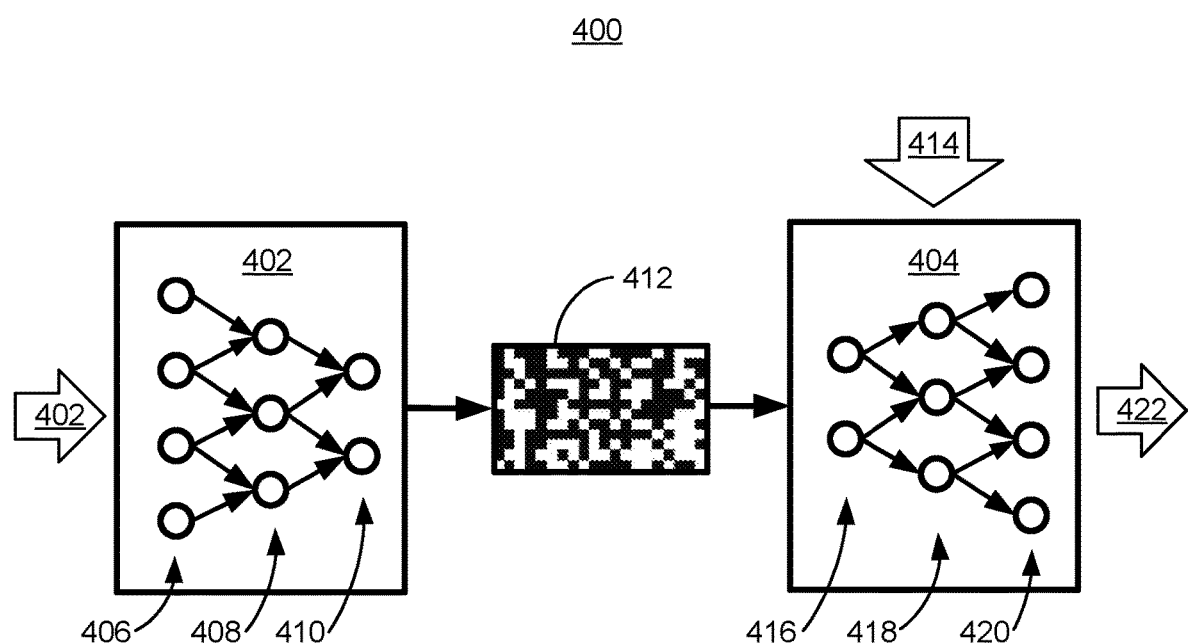
FIG. 4 is a diagram of an example generative query network (GQN).

FIG. 4 is a diagram of a GQN 400 that can be trained to generate views of a 3D scene. A GQN 400 is a neural network architecture in which the GQN can be trained to perceive the surroundings with training on data obtained by vehicle 110 sensors 116, infrastructure sensors, or other vehicle sensors as they move around different traffic scenes. Additionally, HD-map data, e.g. images, may also be used as training data into the network. Similarly, during prediction these inputs may be used to create a scene representation used for GQN prediction. This process of collection of training data may be aided through the use of V-to-X communication. Furthermore, the use of aerial drones to collect additional viewpoints outside of the limitation of roadways or ground surface may be used to improve the networks prediction of arbitrary viewpoints, e.g. bird's eye perspective. There is no human labeling required in training the GQN, similar to a neural network autoencoder, for example. A GQN is composed of a representation network 402 and a generation network 404. The representation network 402 is a deep convolutional neural network that inputs training data from sensors 116 on a vehicle 110 and produces a representation vector 412 of a traffic scene around the vehicle 110. Data from multiple sensors including multiple types of sensors can be fused into a single representation. The representation network 402 can capture data that describes a traffic scene in with fewer bits of data than are required for map data or image data, thereby performing data compression. Data captured in the representation vector 412 includes the location of a roadway around the vehicle 110, relative positions of static and dynamic objects, sounds, depth maps, velocity, etc. and color, specific patterns and features of various objects including vehicles, pedestrians, etc.

Representation network 402 includes layers 406, 408, 410, which can include a plurality of convolutional layers and fully connected layers that can be trained to produce a representation vector 412. In addition, the network may incorporate time series data such as through the use of recurrent layers, e.g. Long Short-Term Memory, (LSTM) neural network layers. The representation vector 412 can be input to generation network 404 along with a query 414. A query 414 is a description of a location, modality (i.e. video, lidar, infrared, etc.), field of view, and direction of a particular sensor. Generation network 404 is a deep convolutional neural network that includes layers 416, 418, 420 that include a plurality of fully-connected and convolutional layers that combine the representation vector 412 and query 414 to determine an output prediction image 422. GQN 400 can be trained by operating vehicle 110 on a roadway or by downloading a GQN 400 trained by training a plurality of vehicles on the roadway and uploading the resulting training data from the plurality of vehicles to a server computer 120 in a traffic infrastructure system 100. Training a GQN 400 in this fashion will permit a computing device 115 in a vehicle 110 to predict the sensor data of other nearby vehicles in varying roadway traffic scenes.

Figure 5:
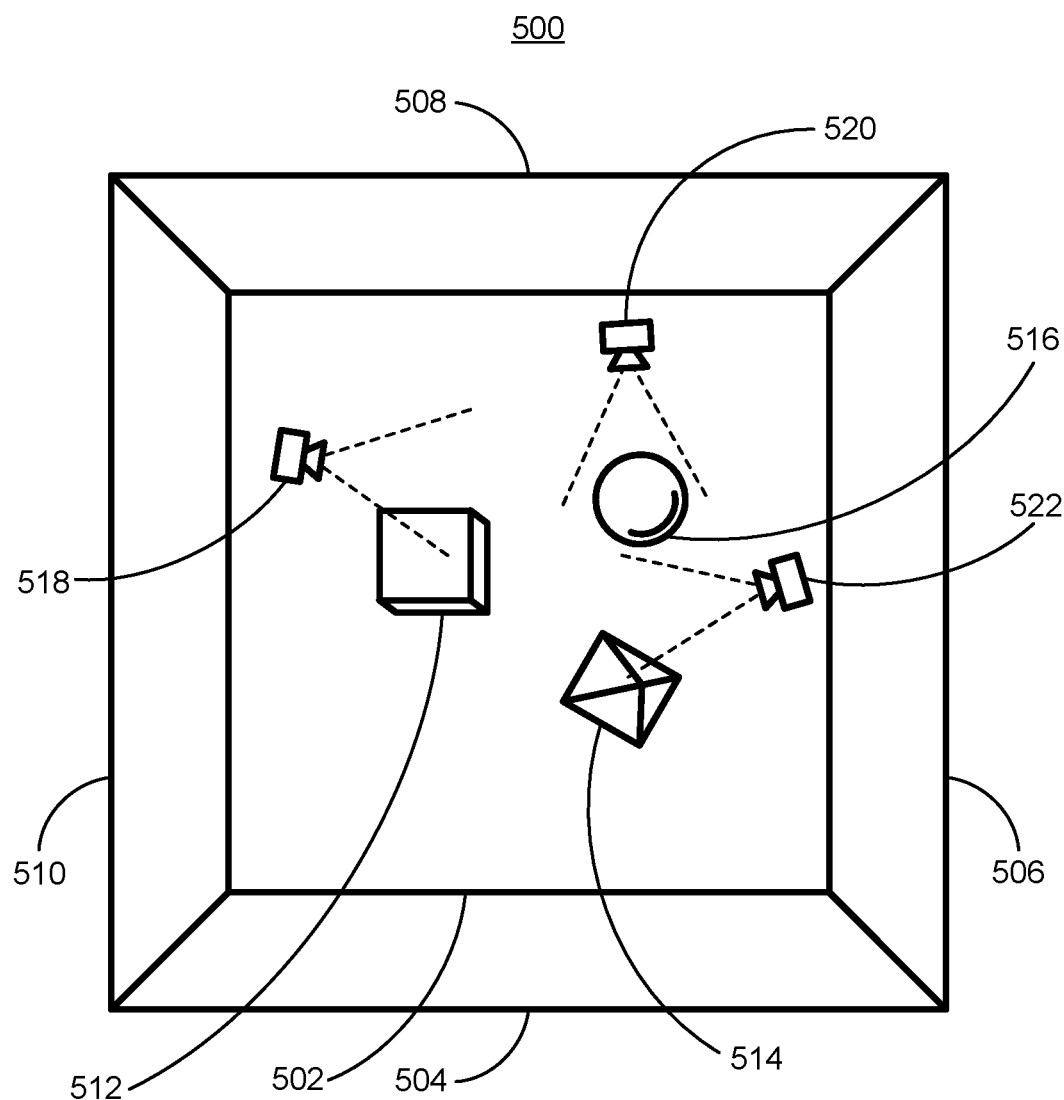
FIG. 5 is a diagram of an example three-dimensional (3D) scene.
Figure 6:
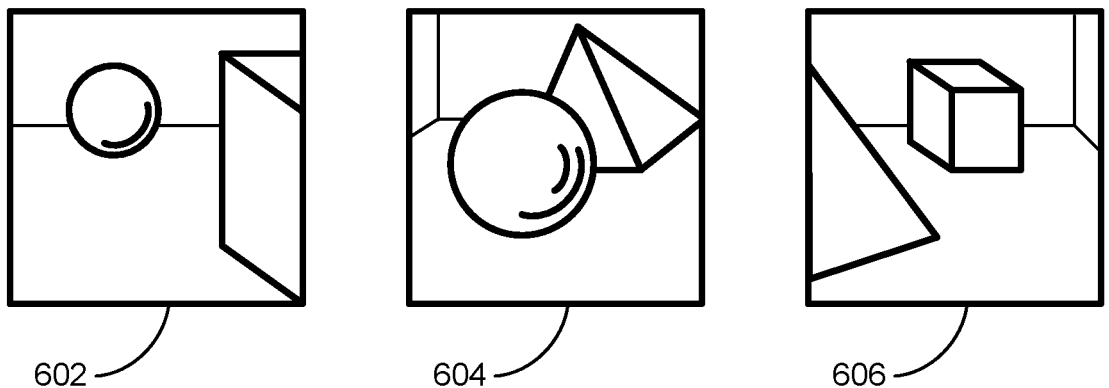
FIG. 6 is a diagram of three example images of a 3D scene.

The generation network 404 can output vehicle viewpoint data as a prediction image 422, which is an image of a traffic scene from a viewpoint observed by a second vehicle but unobserved by vehicle 110. Additional outputs from the network include data from other sensor modalities, such as radar maps, lidar point clouds, etc. Which sensor modality output is utilized can depend on the determination of another vehicle's driving mode including the output from the path prediction algorithm, e.g. a CNN. The unobserved vehicle viewpoint data can be from a point of view of a second vehicle in front of or adjacent to vehicle 110, for example. The unobserved point of view corresponds to data as would be seen through the other vehicle's sensors including a traffic scene in the other vehicle's sensor's field of view. Generation network 404 can generate realistic images without any prior specification of the laws of perspective, occlusion, or lighting. The output prediction image 422 from generation network 404 can be processed as described above in relation to FIG. 2 to identify, classify and locate moving objects including predicting future object locations and thereby determine a vehicle path upon which to operate a vehicle 110. FIGS. 5 and 6 demonstrate GQN 400 processing in an example using an artificial 3D environment.

Output prediction image 422 may also be used to classify objects or perform other perception tasks where a vehicle's and/or other vehicle's sensors are partially or fully occluded. In an area of occlusion an object may be completely or partially hidden. The vehicle may use an output prediction image from another image perspective, e.g. top down perspective or HD map 300 data, to obtain improved situational awareness. Through such a process, the vehicle's own understanding of the driving scene may be improved, and the vehicle may modify its path plan irrespective of additional vehicles in the driving scene.

Output prediction image 422 can include image data which can be then labeled by additional algorithms, e.g. a CNN. Data corresponding to identity, class, and location of included objects. Object labels can include distance to the object and relative object velocity, for example. Output prediction image 422 can be used by computing device 115 as input to a vehicle path prediction neural network as discussed above in relation to FIG. 2 and as input to a process that determines a level of autonomy (non-, semi- or fully-) corresponding to each other vehicle around a vehicle 110. The process to determine autonomy level for other vehicles can rely on V-to-V communications for some vehicles; however, a traffic scene can include vehicles with many differing levels of V-to-V communications capabilities including no V-to-V communications. Autonomy level can sometimes be inferred by observed vehicle lighting schemes, where a pattern is encoded in light transmitted by a vehicle operating autonomously, for example, or by observing vehicle sensor schemes, where lidar and multiple video and radar sensors can correspond to autonomous operation. Activation and type of autonomous operation can be communicated via V-to-X communication, in addition to other data that can include location, velocity, bounding box, etc. Non-autonomous operation can sometimes be determined based on observing the driving behavior of a vehicle. For example, a vehicle making lane changes without signaling or cutting through traffic aggressively may be predicted to have a low confidence of having an autonomous mode activated.

The output of the GQN 400 may be used to validate the accuracy of vehicle sensor data received via V-to-X networking. With V-to-X data there is a possibility of a malicious actor that can transmit fraudulent data, by intent or through error. In such cases, a viewpoint data provided via V-to-X and a viewpoint data determined by a GQN 400 may be compared to validate vehicle sensor accuracy. A Bayesian framework may be applied to interpret the confidence of the GQN 400 prediction images 422. A prediction image 422 generated for given vehicle sensor data should have high predictive accuracy, i.e. the prediction image 422 should substantially match an image received from vehicle sensors, for example. In other examples, output from the GQN 400 may be used alone to predict a view point of a target vehicle. In some examples, the target vehicle may not have V-to-V capability. In other examples the object class would also not have V-to-V capability, such as pedestrians, bicyclists, etc. In such cases the GQN 400 prediction image 422 alone may be used. A Bayesian framework can be applied as discussed above in relation to FIG. 2 with a GQN 400 to determine a confidence in the GQN 400 prediction image 422 by determining a predictive accuracy for a current prediction image 422 conditioned on an observed probability for a previous prediction image 422, where predictive accuracy measures a difference between an output prediction image 422 and an expected prediction image 422 based on previous output prediction images 422.

In addition to path prediction, a reinforcement learning deep neural network can be used with a viewpoint that includes vehicle sensor data via V-to-V combined with prediction images 422 from a GQN 400. A reinforcement learning neural network calculates a reward function based on backpropagated results to train a deep neural network in examples where the reward function can be based on a series of inputs and actions. Dynamic programming techniques can be used to determine a reward function by assuming that the underlying model is a Markov Decision Process, for example. A Markov Decision Process is a processing technique wherein probabilities corresponding to a current event are based solely on probabilities corresponding to one or more immediately preceding events. This viewpoint may be purely visual with or without 3D depth information in the scene. Past vehicle trajectory can be included in the input. In some examples it may be appropriate to include other sensor information, e.g. ultrasound, radar, lidar, audio, etc. to predict human or automated controlled motion planning of the vehicle 110. Additional input may include data from a traffic infrastructure system 100. A CNN can be trained based on vehicle type (car, truck, bicycle, motorcycle, etc.). Further training can differentiate between non-autonomous driving, semi-autonomous driving, and fully-autonomous driving. One technique to select a sub-class of driver model (e.g. aggressive driver vs overly cautious driver) may be minimization of error between the path prediction and observed actual paths of another vehicle from recent historical data while the other vehicle is tracked within the line of sight or V-to-X range of a vehicle 110. Other input may be used to aid the CNN network such as observed brake and turn signals of the vehicle. The output of the CNN is a future path and predicted acceleration/braking for a target vehicle.

A CNN can also be configured for reinforcement learning. Reinforcement learning is a technique to handle reward functions that can require multiple steps to determine an initial reward value. For example, an initial reward value based on a predicted location of a moving object with respect to a vehicle 110 can depend upon reward functions evaluated at future time steps that depend upon where the moving object ends up. This approach is often coupled with imitation learning such that the reward function is to minimize the loss between the neural network's output and some output we desire to imitate. In this case we wish to imitate the driving behavior of a human driver given some input (e.g. images from the perspective of the driver in another vehicle). Dynamic programming techniques can be applied to neural network processing to form reinforcement learning deep neural networks that can evaluate multi-step reward functions in an iterative fashion, for example, to determine initial rewards based on future values of a reward function.

A Bayesian framework can be applied to an RLDNN both to determine the predictive accuracy of the generative projected sensor data and the confidence of the reinforcement learning in the future actions of another vehicle. Applying a Bayesian framework would generate an overall prediction confidence and allow prediction of other path predictions that may be possible but less likely. A future path and predicted acceleration/braking for a target vehicle including a confidence interval determined by the Bayesian framework can be used in determining a vehicle path that avoid collisions or near-collisions of a vehicle 110. For example, only collision or near-collision paths having a "high" confidence can be considered when determining a vehicle path.

In some examples the V-to-X data and GQN 400 prediction images 422 can be combined. For example, a vehicle may lack side view cameras required as input into a path prediction neural network. In this example GQN 400 prediction image 422 of the side view images can be joined with the V-to-X data. Additionally, the V-to-X data may be used as input into the GQN 400 for self-target vehicle 110 or view point prediction of another vehicle better imaged from a target vehicle compared to the host vehicle. Validated V-to-X data, including both vehicle data and traffic infrastructure system 100 data can be used to improve the scene representation output used to predict the view point of a third vehicle or mobile object. In another example, the GQN network may be used to create an isometric or top down perspective of the vehicle for surround view imaging. Given the GQN networks ability to produce an image from any arbitrary perspective and the ability to understand the confidence of the prediction through the Bayesian framework, a user may be able to scroll, pan, and tilt the view arbitrarily where the network's confidence is above some perspective.

FIG. 5 is a diagram of a three-dimensional (3D) scene 500. 3D scene 500 is illustrated from a top-down perspective and includes a floor 502 and four walls 504, 506, 508, 510. Included in 3D scene 500 are three 3D shapes, a cube 512, a tetrahedron 514 and a sphere 516. Also included in 3D scene are three cameras, a first camera 518 at a first location, a second camera 520 at a second location and a third camera 522 at a third location. Each camera 518, 520, 522 has a field of view that points in a direction illustrated by dotted lines. The cameras 518, 520, 522 can each acquire an image of a portion of the 3D scene 500 as viewed from each camera location in the direction of their respective fields of view.

FIG. 6 is a diagram of three images 600 of 3D scene 500 acquired by cameras 518, 520, 522. First image 602 is acquired by first camera 518, second image 606 is acquired by second camera 520 and third image 606 is acquired by third camera 522. Each image 602, 606, 606 includes a different portion of the 3D scene 500 depending upon the location and direction of fields of view of the respective cameras 518, 520, 522 with respect to the 3D scene 500. Techniques described above in relation to FIG. 4 can train a GQN 400 using images 602 and 604 to take input locations and directions with respect to a 3D scene 500 and can generate images corresponding to previously unseen (by the GQN 400) views. For example, in response to a query including a location and direction corresponding to the third camera 522, a trained GQN 400 can output an image matching third image 604, despite not having seen third image 604 during training.

Figure 7:
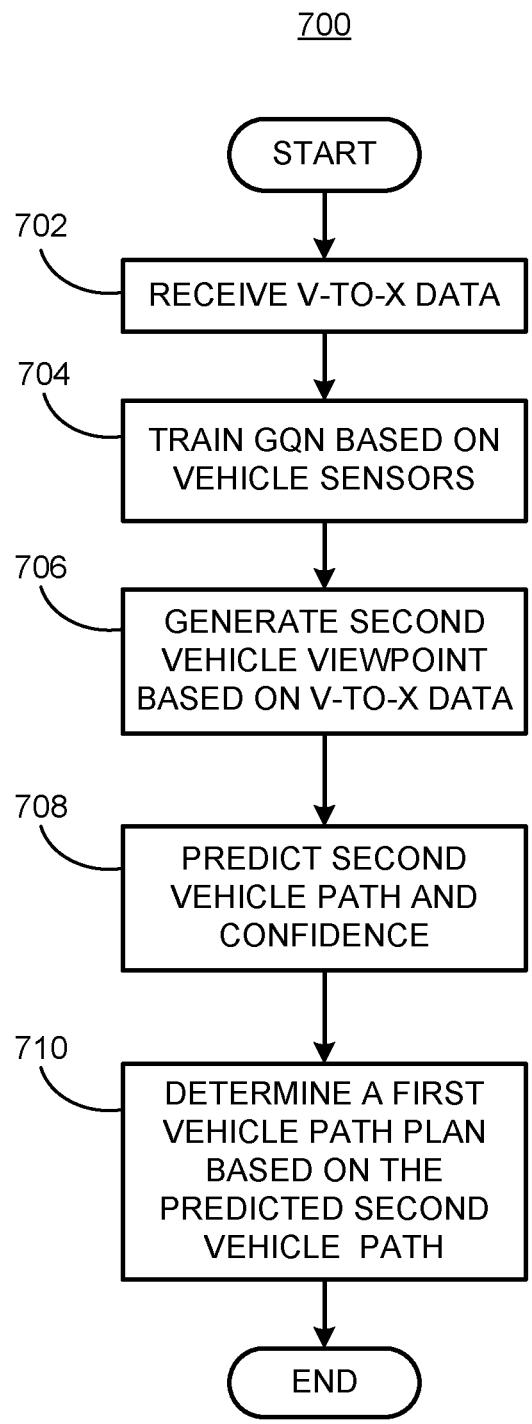
FIG. 7 is a flowchart diagram of a process to determine a first vehicle path based on a predicted second vehicle path.

FIG. 7 is a diagram of a flowchart, described in relation to FIGS. 1-6, of a process 700 for predicting second vehicle path and determining a first vehicle path based on the second vehicle path. Process 700 can be implemented by a processor of computing device 115, taking as input information from sensors, and executing commands, and sending object tracking information to a vehicle 110, for example. Process 700 includes multiple blocks taken in the disclosed order. Process 700 could alternatively or additionally include fewer blocks or can include the blocks taken in different orders.

Process 700 begins at block 702, wherein a computing device 115 in a vehicle 110 receives V-to-X data including sensor data from a second vehicle. The sensor data can be received from a second vehicle via V-to-V networking or from a traffic infrastructure system 100 via V-to-I networking.

At block 704 the computing device 115 trains a generative query network (GQN) by inputting image data from vehicle 110 sensors 116. GQN can also be trained by downloading training data from a traffic infrastructure system 100 as discussed above in relation to FIG. 4.

At block 706 computing device 115 generates a second vehicle viewpoint by inputting the received second vehicle sensor data to the trained GQN and outputting a prediction image as discussed above in relation to FIG. 4. The GQN can include a Bayesian framework that outputs a predictive accuracy that can be processed to form a confidence.

At block 708 computing device 115 can predict a second vehicle path for the second vehicle based on prediction images output by the GQN including a confidence based on predictive accuracy as discussed above in relation to FIG. 4.

At block 710 computing device 115 can determine a vehicle path for a first vehicle based on a predicted second vehicle path. Computing device 115 can filter by confidence in the vehicle path determination, only considering predicted second vehicle paths with "high" confidence as discussed above in relation to FIGS. 2, 3 and 4. Following block 710 process 700 ends.

Computing devices such as those discussed herein generally each include commands executable by one or more computing devices such as those identified above, and for carrying out blocks or steps of processes described above. For example, process blocks discussed above may be embodied as computer-executable commands.

Computer-executable commands may be compiled or interpreted from computer programs created using a variety of programming languages and/or technologies, including, without limitation, and either alone or in combination, Java™, C, C++, Python, Julia, SCALA, Visual Basic, Java Script, Perl, HTML, etc. In general, a processor (e.g., a microprocessor) receives commands, e.g., from a memory, a computer-readable medium, etc., and executes these commands, thereby performing one or more processes, including one or more of the processes described herein. Such commands and other data may be stored in files and transmitted using a variety of computer-readable media. A file in a computing device is generally a collection of data stored on a computer readable medium, such as a storage medium, a random access memory, etc.

A computer-readable medium includes any medium that participates in providing data (e.g., commands), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, Laserdisc any other optical medium, punch cards, paper tape, any other physical medium with patterns of holes, a RAM, a PROM, an EPROM, a FLASH-EEPROM, any other memory chip or cartridge, or any other medium from which a computer can read.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The term "exemplary" is used herein in the sense of signifying an example, e.g., a reference to an "exemplary widget" should be read as simply referring to an example of a widget.

The adverb "approximately" modifying a value or result means that a shape, structure, measurement, value, determination, calculation, etc. may deviate from an exactly described geometry, distance, measurement, value, determination, calculation, etc., because of imperfections in materials, machining, manufacturing, sensor measurements, computations, processing time, communications time, etc.

In the drawings, the same reference numbers indicate the same elements. Further, some or all of these elements could be changed. With regard to the media, processes, systems, methods, etc. described herein, it should be understood that, although the steps or blocks of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

What is claimed is:

1. A computer, comprising a processor; and
a memory, the memory including instructions to be executed by the processor to:
predict second vehicle data including a sensor type, a location, a field of view, and a direction of a sensor included in a second vehicle and input the second vehicle data into a generative query neural network (GQN) included in the computer included in a first vehicle trained to generate second vehicle viewpoint data including an image of a traffic scene from a viewpoint observed by the second vehicle;
predict a path for the second vehicle based on the second vehicle viewpoint data with a reinforcement learning deep neural network (RLDNN);
obtain a confidence for the predicted second vehicle path from a Bayesian framework applied to the RLDNN; and
determine a first vehicle path based on the predicted second vehicle path and the confidence.

2. The computer of claim 1, the instructions further including instructions to download a high definition (HD) map data from a cloud-based traffic infrastructure system via V-to-I networking.

3. The computer of claim 2, wherein the instructions further include instructions to fuse the HD map data with the second vehicle viewpoint data by projecting the second vehicle viewpoint data onto the HD map data based on a location and a field of view of the second vehicle.

4. The computer of claim 1, the instructions further including instructions to process second vehicle viewpoint data with a second RLDNN to detect moving objects in the second vehicle viewpoint data.

5. The computer of claim 4, the instructions further including instructions to include sensor data acquired by traffic infrastructure video cameras in second vehicle viewpoint data.

6. The computer of claim 1, the instructions further including instructions to predict the path for the second vehicle based on one or more of receiving vehicle sensor data from the second vehicle and determining path data based on processing observations of the second vehicle with the second RLDNN.

7. The computer of claim 1, wherein the Bayesian framework determines the confidence based on a prediction accuracy conditioned on observations of previous output prediction accuracies.

8. The computer of claim 1, the instructions further including instructions to compare the second vehicle viewpoint data to the second vehicle sensor data to determine second vehicle sensor data accuracy.

9. The computer of claim 1, wherein determining the first vehicle path based on the predicted second vehicle path and the confidence includes avoiding collisions and near-collisions.

10. The computer of claim 1, the instructions further including instructions to operate the first vehicle based on the first vehicle path by controlling vehicle powertrain, steering and braking.

11. The computer of claim 1, wherein one or more of the sensor type, the location, the field of view, and the direction of the sensor included in the second vehicle is predicted based on data received from the second vehicle via one or more of vehicle-to-vehicle (V-to-V) and vehicle-to-infrastructure (V-to-I) networking.

12. The computer of claim 1, wherein the second vehicle data is predicted based on processing observations of the second vehicle.

13. A method, comprising:
predicting second vehicle sensor data including a sensor type, a location, a field of view, and a direction of a sensor included in a second vehicle and inputting the second vehicle data into a generative query neural network (GQN) included in a computer included in a first vehicle trained to generate second vehicle viewpoint data including an image of a traffic scene from a viewpoint observed by the second vehicle;
predicting a path for the second vehicle based on the second vehicle viewpoint data with a reinforcement learning deep neural network (RLDNN);
obtaining a confidence for the predicted second vehicle path from a Bayesian framework applied to the RLDNN; and
determining a first vehicle path based on the predicted second vehicle path and the confidence.

14. The method of claim 13, further comprising downloading a high definition (HD) map data from a cloud-based based traffic infrastructure system via V-to-I networking.

15. The method of claim 14, further comprising fusing the HD map data with the second vehicle viewpoint by projecting the second vehicle viewpoint data onto the HD map data based on a location and a field of view of the second vehicle.

16. The method of claim 13, further comprising processing second vehicle sensor data with a second RLDNN to detect moving objects in the second vehicle viewpoint data.

17. The method of claim 16, further comprising including sensor data acquired by traffic infrastructure video cameras in second vehicle viewpoint data.

18. The method of claim 13, further comprising predicting the path for the second vehicle based on one or more of receiving vehicle sensor data from the second vehicle and determining path data based on processing observations of the second vehicle with the second RLDNN.

19. The method of claim 13, wherein the Bayesian framework determines the confidence based on a prediction accuracy determined based on observations of previous output prediction accuracies.

20. The method of claim 13, wherein the second vehicle viewpoint data is compared to the second vehicle sensor data to determine second vehicle sensor data accuracy.

* * * * *